United States Patent
Robison et al.

(10) Patent No.: US 11,097,716 B2
(45) Date of Patent: Aug. 24, 2021

(54) CONTROLS AND METHODS FOR OPERATING ELECTRIC POWERTRAIN

(71) Applicant: Ford Global Technologies, LLC, Dearborn, MI (US)

(72) Inventors: Aubry Robison, Oak Park, MI (US); Christopher Adam Ochocinski, Canton, MI (US); Kingsley Sarkodie, Southgate, MI (US); Maia Johnson, Birmingham, AL (US)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 16/662,249

(22) Filed: Oct. 24, 2019

(65) Prior Publication Data

US 2021/0122354 A1 Apr. 29, 2021

(51) Int. Cl.
*B60W 10/02* (2006.01)
*B60W 10/08* (2006.01)
*B60W 20/11* (2016.01)
*B60W 20/14* (2016.01)

(52) U.S. Cl.
CPC .......... *B60W 20/11* (2016.01); *B60W 10/023* (2013.01); *B60W 10/026* (2013.01); *B60W 20/14* (2016.01)

(58) Field of Classification Search
CPC .......... B60W 10/0235; B60W 10/024; B60W 10/026; B60W 10/06; B60W 10/08; B60W 20/11; B60W 20/14; B60W 20/50; F16H 2059/385; F16H 59/42; F16H 59/46
See application file for complete search history.

(56) References Cited

U.S. PATENT DOCUMENTS

| | | |
|---|---|---|
| 5,121,820 A | 6/1992 | Brown et al. |
| 5,613,583 A * | 3/1997 | Kono ............. F16H 61/143 192/3.31 |
| 5,643,136 A * | 7/1997 | Kono ............. F16H 61/143 477/169 |
| 6,364,807 B1 | 4/2002 | Koneda et al. |
| 7,070,530 B2 | 7/2006 | Ai et al. |
| 7,644,812 B2 | 1/2010 | Simpson et al. |
| 7,743,678 B2 | 6/2010 | Wittkopp et al. |
| 7,758,467 B2 | 7/2010 | Ashizawa et al. |
| 7,896,114 B2 | 3/2011 | Colvin et al. |
| 7,909,730 B2 | 3/2011 | Schwarz et al. |
| 8,315,752 B2 | 11/2012 | Kwon et al. |

(Continued)

FOREIGN PATENT DOCUMENTS

JP 5287780 B2 9/2013
KR 1020050098681 A 10/2005

*Primary Examiner* — Edwin A Young
(74) *Attorney, Agent, or Firm* — David B. Kelley; Brooks Kushman P.C.

(57) ABSTRACT

A vehicle includes and engine and a transmission having a torque converter with an impeller and a turbine. An electric machine is fixed to the impeller. At least one controller is programmed to, in response to a difference between measured and estimated speeds of the impeller exceeding a threshold, command a torque to the electric machine based on a maximum of the measured and estimated speeds of the impeller, and programmed to, in response to the difference being less than the threshold, command another torque to the electric machine based on the measured speed of the impeller.

20 Claims, 6 Drawing Sheets

(56) References Cited

U.S. PATENT DOCUMENTS

| | | |
|---|---|---|
| 8,571,771 B2 | 10/2013 | Kresse |
| 8,602,939 B2 | 12/2013 | Yamazaki et al. |
| 8,715,136 B1 | 5/2014 | Dai et al. |
| 8,911,324 B2 | 12/2014 | Doering |
| 9,031,722 B2 | 5/2015 | Doering et al. |
| 9,067,594 B2 | 6/2015 | Wang et al. |
| 9,573,579 B2 | 2/2017 | Johri et al. |
| 10,106,148 B2 | 10/2018 | Meyer et al. |
| 2002/0170758 A1 | 11/2002 | Shimabukuro et al. |
| 2003/0229429 A1 | 12/2003 | Brown et al. |
| 2006/0089232 A1 | 4/2006 | Kobayashi et al. |
| 2007/0056784 A1 | 3/2007 | Joe et al. |
| 2007/0191181 A1 | 8/2007 | Burns |
| 2008/0119975 A1 | 5/2008 | Yamazaki et al. |
| 2009/0093339 A1 | 4/2009 | Chen |
| 2009/0143950 A1 | 6/2009 | Hasegawa et al. |
| 2009/0194381 A1 | 8/2009 | Samie et al. |
| 2010/0087290 A1 | 4/2010 | Schoenek et al. |
| 2011/0061954 A1 | 3/2011 | Singh et al. |
| 2011/0118915 A1 | 5/2011 | Ortmann et al. |
| 2011/0165992 A1 | 7/2011 | Ueno et al. |
| 2011/0245034 A1 | 10/2011 | Yoshida et al. |
| 2013/0012353 A1 | 1/2013 | Yoshida et al. |
| 2013/0023380 A1 | 1/2013 | Sah |
| 2013/0274969 A1 | 10/2013 | Wang et al. |
| 2013/0291830 A1 | 11/2013 | Doering et al. |
| 2013/0296108 A1 | 11/2013 | Ortmann et al. |
| 2013/0296119 A1 | 11/2013 | Reed |
| 2013/0296123 A1 | 11/2013 | Doering |
| 2013/0297162 A1 | 11/2013 | Dai et al. |
| 2015/0111693 A1 | 4/2015 | Wang et al. |
| 2015/0198243 A1 | 7/2015 | Johri et al. |
| 2015/0211424 A1 | 7/2015 | Nomura |
| 2015/0274172 A1 | 10/2015 | Yamanaka et al. |
| 2016/0031431 A1 | 2/2016 | Johri et al. |
| 2016/0236670 A1 | 8/2016 | Johri et al. |
| 2018/0050687 A1 | 2/2018 | Meyer et al. |
| 2018/0281778 A1* | 10/2018 | Zhang .................. B60W 10/02 |
| 2020/0346652 A1* | 11/2020 | Petrich .................. B60W 10/08 |

* cited by examiner

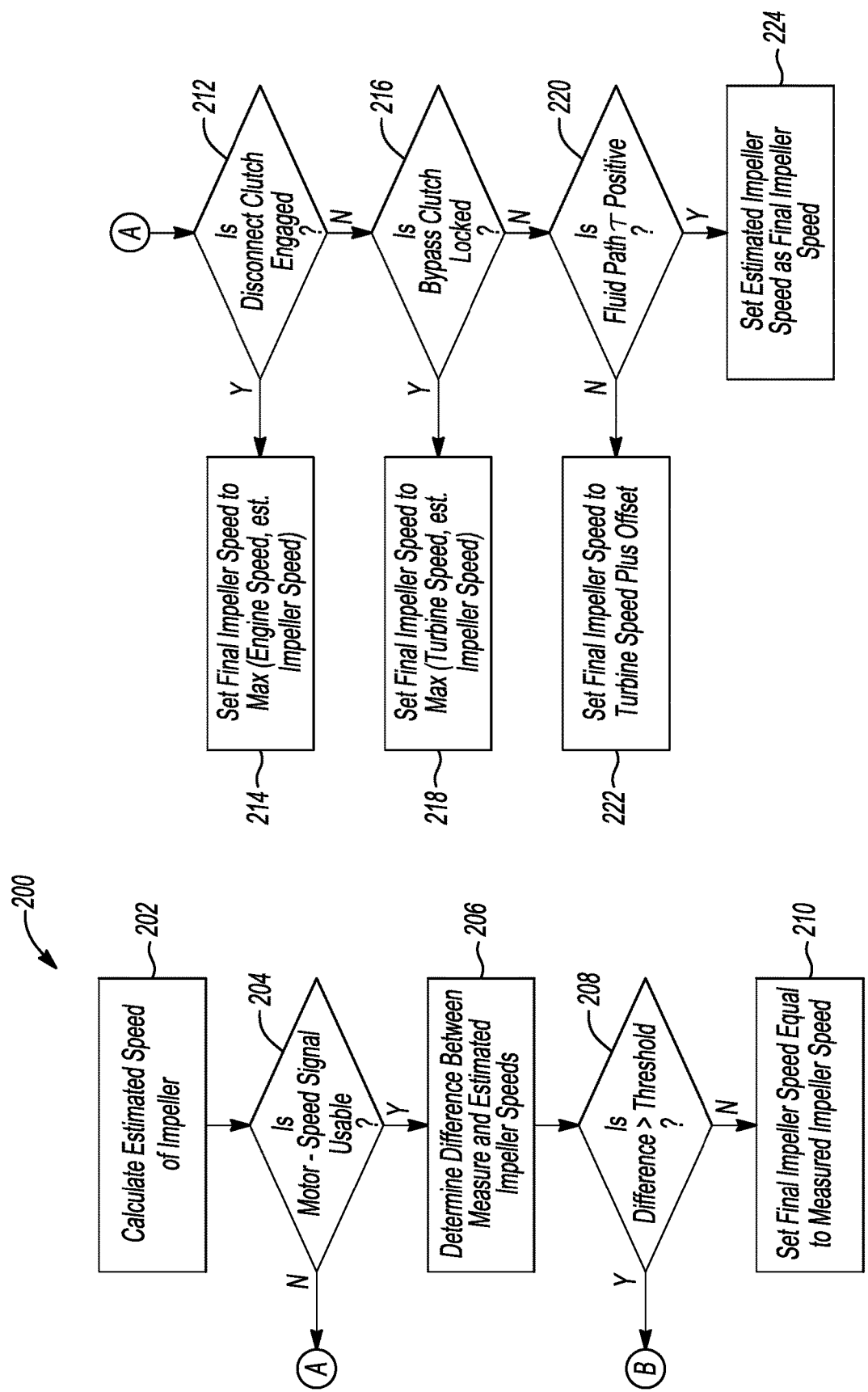

CONTROLS AND METHODS FOR OPERATING ELECTRIC POWERTRAIN

TECHNICAL FIELD

The present disclosure relates to hybrid-electric vehicles and more specifically to controlling an electric machine using an estimated impeller speed.

BACKGROUND

A hybrid-electric powertrain includes an engine and an electric machine. The torque (or power) produced by the engine and/or the electric machine can be transferred through a transmission to the driven wheels to propel the vehicle. A traction battery supplies energy to the electric machine.

SUMMARY

According to one embodiment, a vehicle includes a transmission having a torque converter with an impeller and a turbine. An electric machine is fixed to the impeller. At least one controller is programmed to, in response to a difference between measured and estimated speeds of the impeller exceeding a threshold, command a torque to the electric machine based on a maximum of the measured and estimated speeds of the impeller, and programmed to, in response to the difference being less than the threshold, command another torque to the electric machine based on the measured speed of the impeller.

According to another embodiment, a vehicle includes an engine having a crankshaft and a transmission having a torque converter. The torque converter has an impeller coupled to the crankshaft and a turbine fixed to a turbine shaft that is driveably connected to driven wheels of the vehicle. An electric machine has a rotor selectively coupled to the crankshaft via a disconnect clutch and fixed to the impeller. A first sensor is configured to output a first signal indicative of a measured speed of the impeller, and a second sensor is configured to output a second signal indicative of a measured speed of the turbine. A vehicle controller is programmed to, in response to the disconnect clutch being disengaged and the first signal being unusable, command a torque to the electric machine based on an estimated speed of the impeller that is derived from the measured speed of turbine and an estimated torque of the impeller.

According to yet another embodiment, a vehicle includes an engine having a crankshaft and a transmission having a torque converter. The torque converter has an impeller coupled to the crankshaft and a turbine fixed to a turbine shaft that is driveably connected to driven wheels of the vehicle. An electric machine has a rotor selectively coupled to the crankshaft via a disconnect clutch and fixed to the impeller. A first sensor is configured to output a first signal indicative of a measured speed of the impeller, and a second sensor is configured to output a second signal indicative of a speed of the turbine. At least one controller is programmed to calculate an estimated speed of the impeller based on the speed of turbine and an estimated torque of the impeller and calculate an arbitrated impeller speed. The arbitrated impeller speed is (i) equal to a speed of the engine responsive to the disconnect clutch being engaged and (ii) equal to the estimated speed of the impeller responsive to the disconnect clutch being disengaged. The controller is further programmed to compare the measured and arbitrated speeds of the impeller to determine a difference. In response to the difference exceeding a threshold, the controller sets a final impeller speed equal to a maximum of the measured and arbitrated speeds of the impeller. In response to the difference being less than the threshold, the controller sets the final impeller speed equal to the measured speed of the impeller. The controller is also programmed to command a torque to the electric machine based on the final impeller speed and an accelerator pedal position.

BRIEF DESCRIPTION OF THE DRAWINGS

FIGS. 4A-4C illustrate a flow chart of an algorithm for determining a final impeller speed.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
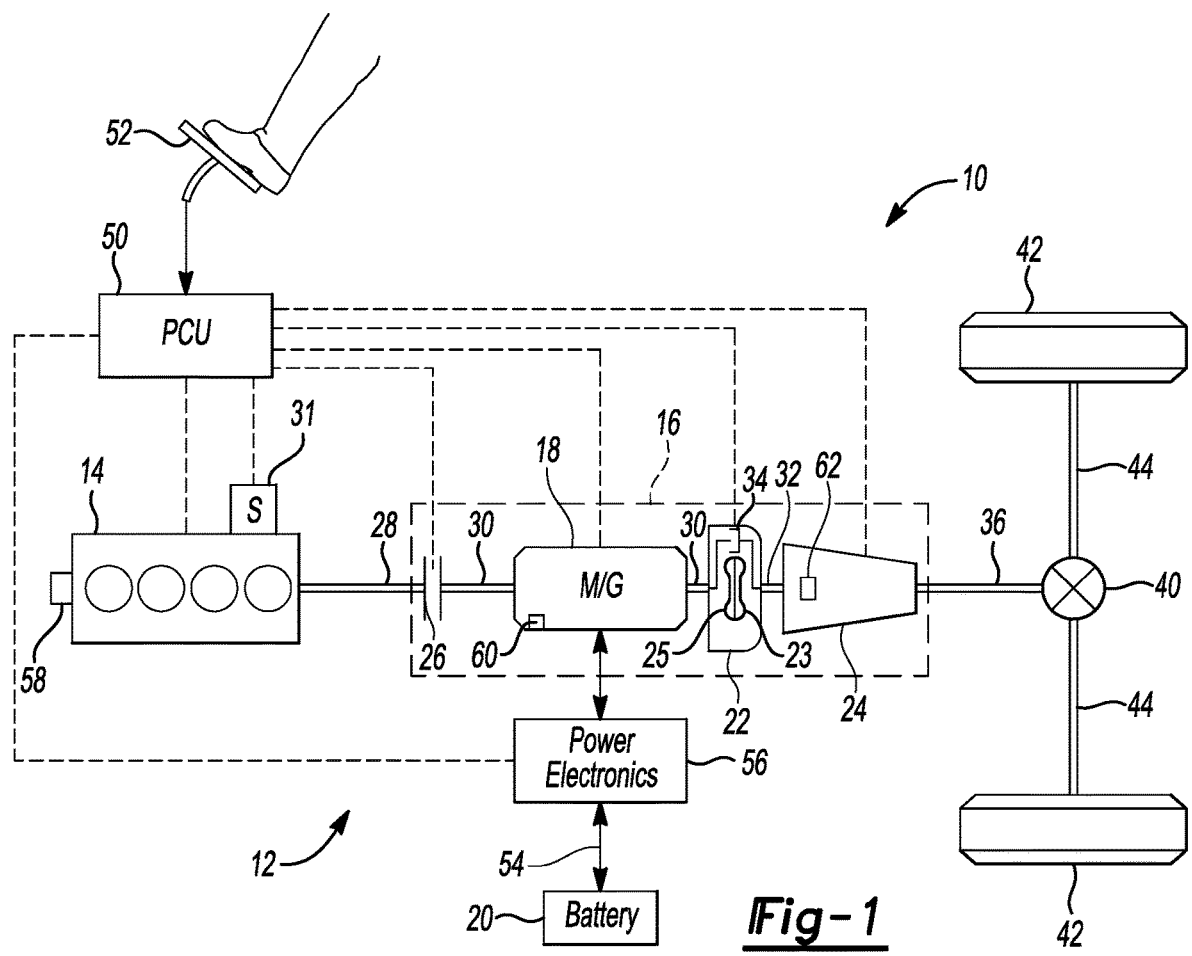
FIG. 1 is a schematic diagram of an example hybrid-electric vehicle.

Referring to FIG. 1, a schematic diagram of a hybrid-electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12 having an engine 14 that drives a transmission 16, which may be referred to as a modular-hybrid transmission (MHT). As will be described in further detail below, a transmission 16 includes an electric machine such as an electric motor/generator (M/G) 18, an associated traction battery 20, a torque converter 22, and a multiple step-ratio automatic transmission, or gearbox 24. The M/G may also be referred to as the motor 18.

The engine 14 and the M/G 18 are both drive sources for the HEV 10. The engine 14 generally represents a power source that may include an internal-combustion engine such as a gasoline, diesel, or natural gas powered engine, or a fuel cell. The engine 14 generates an engine power and corresponding engine torque that is supplied to the M/G 18 when a disconnect clutch (KO clutch) 26 between the engine 14 and the M/G 18 is at least partially engaged. The M/G 18 may be implemented by any one of a plurality of types of electric machines. For example, M/G 18 may be a permanent-magnet-synchronous motor. Power electronics 56 condition direct current (DC) provided by the battery 20 to the requirements of the M/G 18, as will be described below. For example, power electronics may provide three-phase alternating current (AC) to the M/G 18.

When the disconnect clutch 26 is at least partially engaged, power flows from the engine 14 to the M/G 18. Power flow from the M/G 18 to the engine 14 is also possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. The shaft 30 extends through the M/G 18. The rotor 19 of the M/G 18 is fixed on the shaft 30, whereas the engine 14 is selectively driveably connected to the shaft 30 only when the disconnect clutch 26 is at least partially engaged.

A separate starter motor 31 can be selectively engaged with the engine 14 to rotate the engine to allow combustion to begin. The starter motor 31 may be powered by a 12-volt system of the vehicle. Once the engine is started, the starter motor 31 can be disengaged from the engine via, for example, a solenoid that engages/disengages a pinion gear with the ring gear on the flywheel (not shown). In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine to the M/G to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is driveably connected to the torque converter 22 via the shaft 30. For example, the torque-converter housing may be fastened to the shaft 30. The torque converter 22 is therefore driveably connected to the engine 14 when the disconnect clutch 26 is at least partially engaged. Two components are driveably connected if they are connected by a power flow path that constrains their rotational speeds to be directly proportional. The torque converter 22 includes an impeller 23 fixed to the torque-converter housing (and consequently, fixed to the rotor 19) and a turbine 35 fixed to a transmission input shaft 32 that is driveably connected to the driven wheels 42. The torque converter 22 provides a hydraulic coupling between the shaft 30 and the transmission input shaft 32. The torque converter 22 transmits power from the impeller 23 to the turbine 35 when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may be provided to, when engaged, frictionally or mechanically couple the impeller and the turbine of the torque converter 22, permitting more efficient power transfer. The torque converter bypass clutch 34 may be operated as a launch clutch to provide smooth vehicle launch. The bypass clutch 34 may be a wet-friction clutch controlled by fluid pressure supplied by the transmission pump or an auxiliary pump. The disks of the clutch frictionally engage to transfer torque through the bypass clutch when fluid pressure reaches a threshold value. In some applications, the disconnect clutch 26 is generally referred to as an upstream clutch and bypass clutch 34 is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 32. The gearbox 24 is automatically shifted from one ratio to another based on various vehicle and ambient operating conditions by an associated controller, such as a powertrain-control unit (PCU) 50. The gearbox 24 then provides powertrain output torque to output shaft 38. The output shaft 38 may be connected to a driveline 39 (e.g., a driveshaft and universal joints) that connects the output shaft 38 to the differential 40.

It should be understood that the hydraulically controlled gearbox 24 used with a torque converter 22 is but one example of a gearbox or transmission arrangement; any multiple-ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 38 may be connected to a driveline 39 that connects the output shaft 38 to the differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

While illustrated as one controller, the controller 50 may be part of a larger control system and may be controlled by various other controllers throughout the vehicle 10, such as a vehicle-system controller (VSC) and a high-voltage battery controller (BECM). It is to be understood that the powertrain-control unit 50 and one or more other controllers can collectively be referred to as a "controller" that controls various actuators in response to signals from various sensors to control functions such as starting/stopping engine 14, operating M/G 18 to provide wheel torque or charge the battery 20, select or schedule transmission shifts, etc. The controller 50 may include a microprocessor or central processing unit (CPU) in communication with various types of computer readable storage devices or media. Computer readable storage devices or media may include volatile and nonvolatile storage in read-only memory (ROM), randomaccess memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine, traction battery, transmission, or other vehicle systems.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 50 may communicate signals to and/or from the engine 14, disconnect clutch 26, M/G 18, launch clutch 34, transmission gearbox 24, and power electronics 56, one or more sensors. For example, the vehicle 10 may include a sensor 58, e.g., crank-position sensor, configured to output a signal indicative of a speed of the engine, a sensor 60 configured to output a signal indicative of a speed of the M/G 18, and a sensor 62 configured to output a signal indicative of the speed of the transmission input shaft 32. The sensor 60 may be disposed within a housing of the M/G 18 and is configured to sense rotation of the rotor. The sensor 62 may be disposed within the gearbox 24 and is configured to sense rotation of the transmission input shaft 32 or other component fixed thereto. Since many components of the powertrain 12 are fixed or selectively coupled, speeds of many other components can be determined with the sensors 58, 60, and 62. For example, the impeller 23 is fixed to the M/G shaft 30 and the turbine 25 is fixed to the transmission input shaft 32. Therefore, the readings of the sensor 60 also indicates the speed of the impeller 23 and the readings of the sensor 62 also indicates the speed of the turbine 25. When the disconnect clutch 26 is engaged, crankshaft the engine 14 is coupled to the impeller 23 and thus the readings of the sensor 58 also indicates the speed of the impeller 23.

Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air-conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure (if applicable), crankshaft position (PIP), engine rotational speed (RPM), wheel speeds, vehicle speed, coolant temperature, intake-manifold pressure, accelerator-pedal position, ignition-switch position, throttle-valve position, air temperature, exhaust-gas oxygen or other exhaust gas component concentration or presence, intake-air flow), transmission gear, ratio, or mode, transmission-oil temperature, torque converter bypass clutch 34 status, slowing or shift mode, impeller speed, fluid-path torque of the torque converter, torque converter temperature for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. The pedal 52 may include a pedal-position sensor. In general, depressing and releasing the pedal 52 causes the pedal sensor to generate an accelerator-pedal-position signal that may be interpreted by the controller 50 as a demand for increased power or decreased power, respectively. Based at least upon input from the pedal, the controller 50 commands torque from the engine 14 and/or the M/G 18. The controller 50 also controls the timing of the gear shifts within the gearbox 24, as well as engagement or disengagement of the disconnect clutch 26 and the torque converter bypass clutch 34. Like the disconnect clutch 26, the bypass clutch 34 can be modulated across a range between the engaged and disengaged positions. This produces a variable slip in the torque converter 22 in addition to the variable slip produced by the hydrodynamic coupling between the impeller and the turbine. Alternatively, the bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as "hybrid mode," "engine-motor mode," or "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter and a DC/DC converter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive (e.g. drive) or negative (e.g. regenerative) torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely an example and is not intended to be limiting. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

The vehicle-control system (which includes the controller 50) determines a driver-demanded torque based on signals from a pedal-position sensor associated with the accelerator pedal 52. This torque may be delivered by placing the powerplants (e.g., the engine and M/G) in torque control. In torque control, the controller determines a torque split between the engine and the motor and commands that torque from each of the powerplants.

In hybrid mode and electric-only mode, the M/G 18 provides at least a portion of the wheel torque used to propel the vehicle. The torque commanded to the M/G 18 by the controller 50 is based on many factors including the driver-demanded torque and the torque split between the engine and the M/G 18. The driver-demanded torque may be determined by a lookup table that correlates accelerator-pedal position and impeller speed. The vehicle may be calibrated so that, for a same accelerator-pedal position, the driver-demanded torque decreases as the impeller speed increases and increases as the impeller speed decreases. Once the driver demanded torque is determined, the controls determines the torque split between the engine and the M/G 18 and takes appropriate action to produce the desired torque from the engine 14 and the M/G 18.

Since the driver-demanded torque is a function of impeller speed, the controller 50 needs an accurate estimated (calculated) impeller speed or an accurate measured impeller speed to correctly operate the vehicle. As explained above, the vehicle 10 may measure the impeller speed using the motor speed sensor 60. The vehicle controller 50 may also calculate an estimated impeller speed as a backup to be used when the signal from the speed sensor 60 is unavailable and to determine if the readings of the speed sensor 60 are valid.

Calculating an estimated impeller speed ensures that there is a usable value for the driver-demanded torque table(s) even when the sensor 60 is not working properly. The estimated impeller speed may be calculated using an inverse torque converter model with substitutions of validated signals from the powertrain architecture. This model substitutes validated signals, e.g., the engine speed and turbine speed, when the vehicle is in certain states. The impeller speed validation model may include three main parts. First, an estimated impeller speed is calculated based on turbine speed and impeller torque. Next, the estimated impeller speed is improved using validated signal substitution such as engine speed and others depending upon the disconnect clutch status, the bypass clutch status, and the direction of driveline torque. Lastly, the controller determines a final impeller speed by choosing between the measured impeller speed, the estimated impeller speed, or a blended value.

The estimated impeller speed may be calculated based on turbine speed, torque-converter impeller torque, and torque-converter temperature. In one or more embodiments, equation 1 is used to calculate the estimated impeller speed, wherein $N_i$ is impeller speed, $N_t$ is turbine speed, $\tau_i$ is impeller torque, gain is a constant, T is temperature of the torque converter, and fz is a Z function. The Z function may be stored in a lookup table.

$$N_i = \frac{N_t}{f_z\left[\tau_i \times \left(\frac{\text{Gain}}{N_t}\right)^2, T\right]} \quad \text{(Eq. 1)}$$

Figure 2:
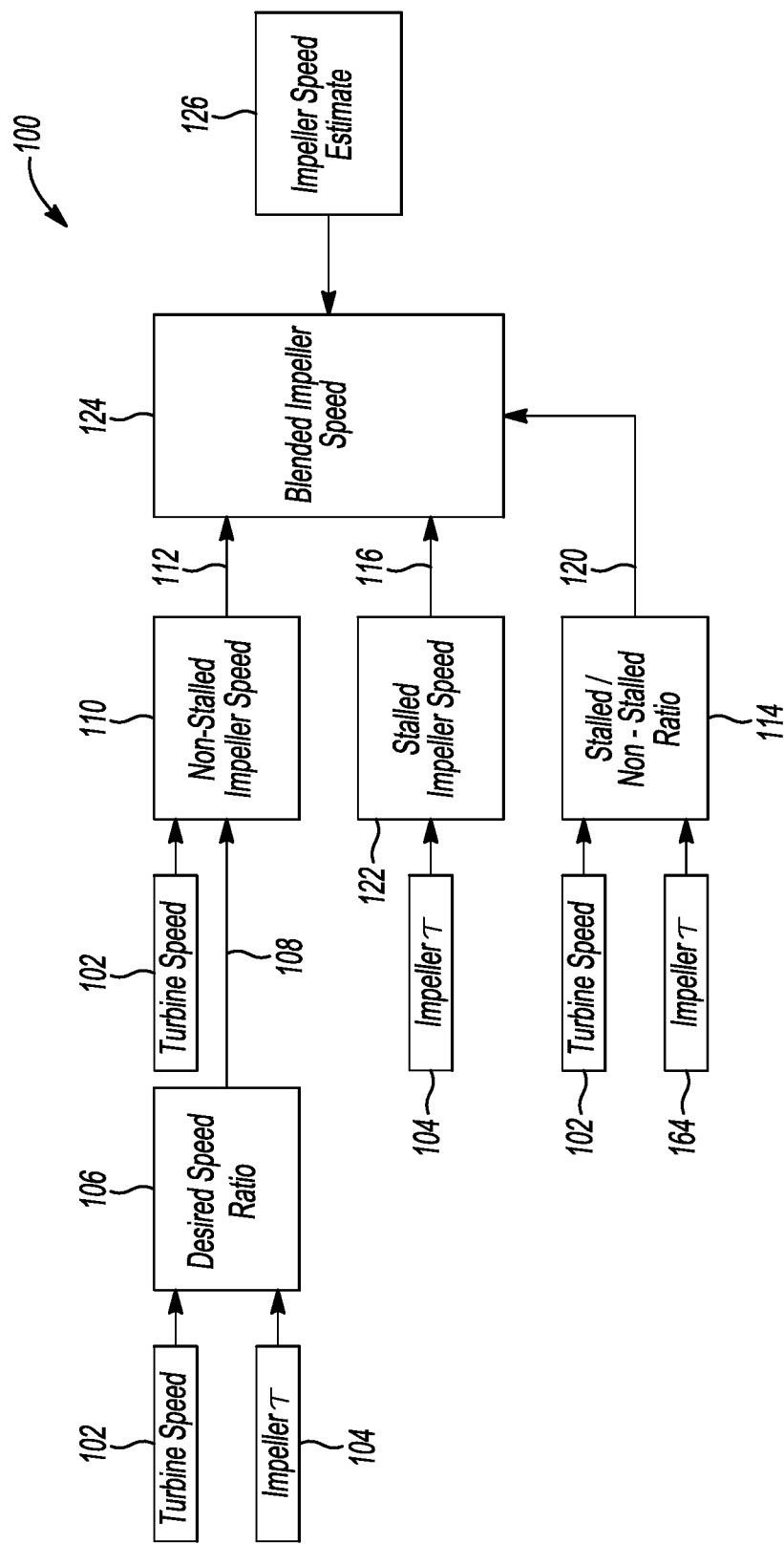
FIG. 2 is a control diagram for calculating an estimated impeller speed.

Referring to FIG. 2, controls 100 for calculating the estimated impeller speed may be executed by the controller 50. The controls 100 use at least turbine speed 102 and impeller torque 104 as inputs to determine the estimated impeller speed. The turbine speed 102 may be measured by the sensor 62. The impeller torque is equal to the engine torque plus the motor torque. Generally, the actual motor torque is equal to the commanded motor torque whereas the actual engine varies somewhat from the commanded engine torque. The engine control module is programmed to estimate the produced engine torque. The impeller torque 104 may be an estimated value that is equal to the commanded motor torque plus the estimated engine torque. The turbine speed 102 and the impeller torque 104 are fed into control box 106 that determines a desired speed ratio 108 of the impeller to the turbine using a lookup table. The turbine speed 102 and the desired speed ratio 108 of box 106 are output to control box 110 that determines the non-stalled impeller speed 112. The non-stalled impeller speed may be calculated by dividing the turbine speed 102 by the desired speed ratio 108 The controls of boxes 106 and 110 are based on equation 1.

The controls 100 also calculate the stalled impeller speed 120 by feeding the impeller torque 104 into control box 122. The stalled impeller speed 120 may be calculated by equation 2.

$$N_i = \sqrt{\frac{\tau_i}{f_z}} \quad \text{(Eq. 2)}$$

The turbine speed 102 and the impeller torque 104 are also fed into control box 114 that outputs the stalled over non-stalled ratio of the impeller 116. In box 114, for example, the impeller torque 104 is used in conjunction with a lookup table to determine a nominal impeller speed for a stalled torque converter. The nominal impeller speed and the turbine speed 102 are used to determine a speed ratio that then can be used in another lookup table to determine the stalled/non-stalled ratio to use in blending. Control box 124 receives the non-stalled impeller speed 112, the stalled over non-stalled ratio 116, and the stalled impeller speed 120 and determines a blended impeller speed that is output as the impeller speed estimate 126.

Figure 3:
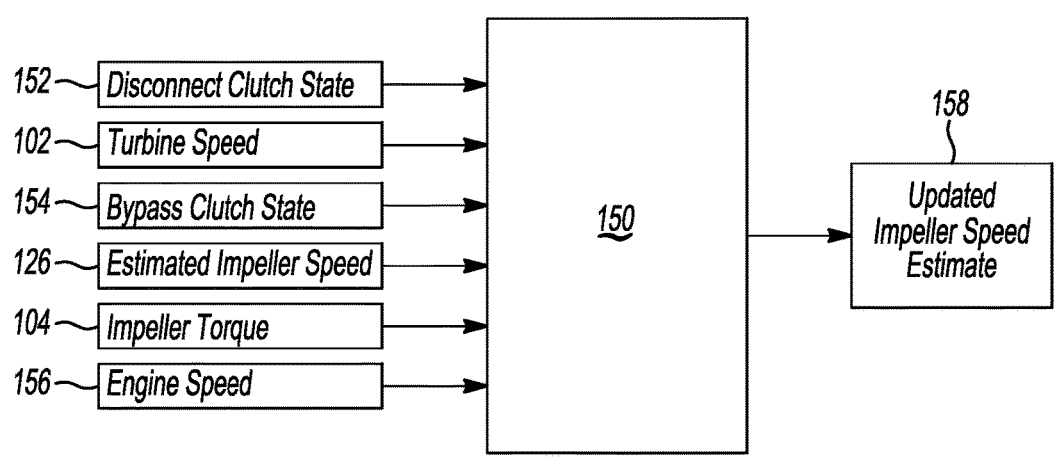
FIG. 3 is a control diagram for determining a final impeller speed.

The estimated impeller speed 126 can be validated using various sensors of the vehicle depending upon the state of the disconnect clutch 26 and the bypass clutch 34. FIG. 3 illustrates controls 150 for validating the estimated impeller speed 126. The controls 150 may use the disconnect clutch state 152, turbine speed 102, the bypass clutch state 154, the estimated impeller speed 126, the impeller torque 104, and the engine speed 156 to calculate an updated impeller speed estimate 158 that will be used as the final impeller speed to determine the driver-demanded torque. In at least the illustrated architecture, the engine 14 is coupled to the impeller 23 when the disconnect clutch 26 is engaged and thus the engine speed and the impeller speed are equal. Here, the speed sensor 58 can be used to validate the estimated impeller speed 126. Similarly, when the bypass clutch 34 is fully engaged (locked), the impeller 23 and the turbine 25 are rotationally coupled and have the same speed. Thus, the sensor 62 may be used to validate the estimated impeller speed 126.

Figure 4C:
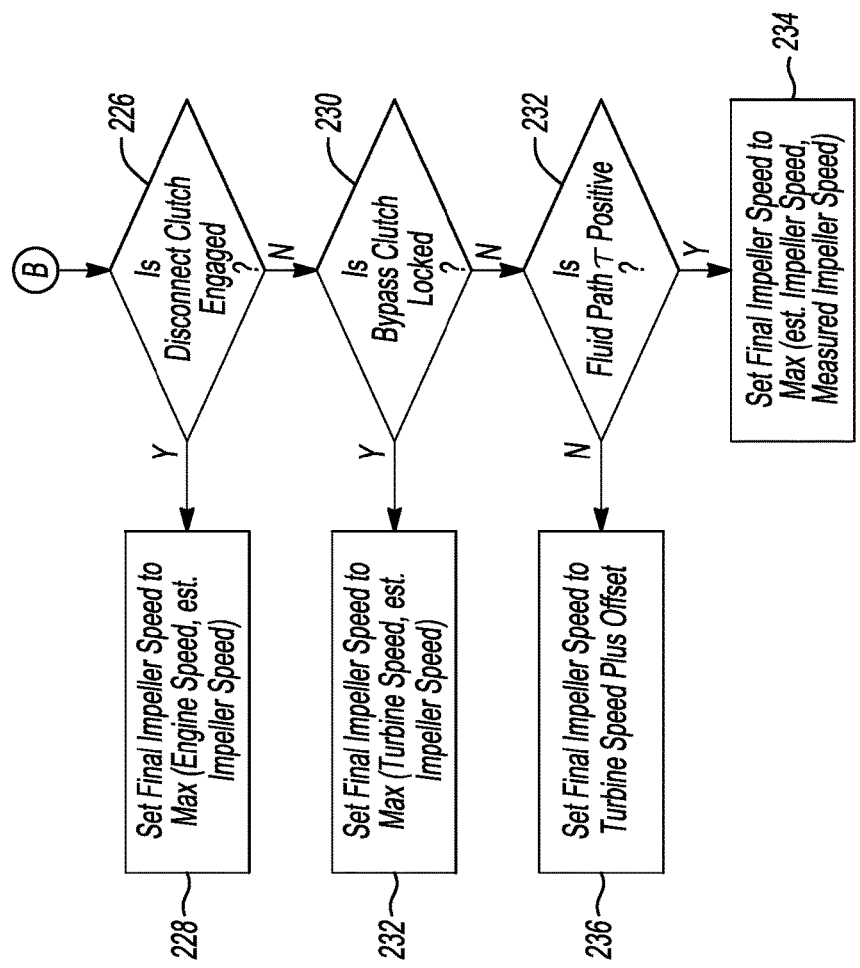

FIGS. 4A through 4C illustrates a flow chart 200 of an example algorithm for determining a final impeller speed. The flowchart 200 begins at operation 202 where the controller calculates an estimated speed of the impeller as described above. At operation 204, the controller determines if signals from the speed sensor 60 are usable. The signals may be unusable if they are not present or otherwise not interpretable by the controller. If the signals from the sensors 60 are usable, the controller then determines whether or not they are valid at operation 206. The controller may determine the validity of the signals by comparing the measured impeller speed with the estimated impeller speed from operation 202. If an absolute value of the difference between the measured and estimated impeller speeds exceeds a threshold, then the validity of the measured impeller speed is questionable and will not solely used for controlling the torque command to the M/G. According to one or more embodiments, the threshold may be between 100 and 300 RPMs. At operation 208, the controller determines if the difference between the measured and estimated impeller speeds is greater than the threshold. If no, control passes to operation 210 and the final impeller speed is set equal to the measured impeller speed. In an alternative embodiment, the output of operation 210 (final impeller speed) may be set equal a maximum of the measured impeller speed and the estimated impeller speed.

If the motor speed signal is unusable at operation 204, control passes to operation 212 and the controller determines if the disconnect clutch is engaged. When the disconnect clutch is engaged, the impeller and the crankshaft of the engine are fixed to each other and thus have the same speed. Thus, signals from the sensor 58 can be used to determine a measured impeller speed. If yes at operation 212, control passes operation 214 and the final impeller speed is set to the maximum of the engine speed and the estimated impeller speed. The maximum provides a more conservative value. That is, driver-demanded torque decreases as impeller speed increases. In other embodiments, the final impeller speed may be set equal to the engine speed at operation 214.

If the disconnect clutch is disengaged, the controls then seek to use other measured speeds to determine the final impeller speed. At operation 216, the controller determines if the bypass clutch is locked. When the bypass clutch is locked, the impeller and the turbine are fixed to one another. The speed sensor 62 measures the speed of the turbine shaft (transmission input shaft) and thus measures the speed of the impeller when the bypass clutch is locked. If the bypass clutch is locked, control passes operation 218 and the final impeller speed is set to the maximum of the turbine speed and the estimated impeller speed. In other embodiments, the final impeller speed may be set to the turbine speed.

If no at operation 216, control passes operation 220 and the controller determines if the impeller torque is positive. Positive torque refers to the actuators driving the wheels, e.g., acceleration, whereas negative torque refers to the wheels driving the actuators, e.g., slowing. Equation 1 is only valid for positive impeller torque; therefore, the estimated impeller speed is not used when the impeller torque is negative. When the impeller torque is negative, the controller, at operation 222, sets the final impeller speed equal to the turbine speed plus an offset that is based on the geometry of the torque converter and other considerations. If the impeller torque is positive, the controller sets the estimated impeller speed as the final and speller speed at operation 224.

If the difference between the measured and estimated impeller speeds exceeds the threshold at operation 208, control passes to operation 226 where the controller determines if the disconnect clutch is engaged. If yes, control passed to operation 228 and the final impeller speed is set to the maximum of the engine speed and the estimated impeller speed. In other embodiments, the final impeller speed may be set equal to the engine speed. If no at operation 226, control passes to operation 230 where the controller determines if the bypass clutch is locked. If the bypass clutch is locked, control passes to operation 232 and the controller sets the final impeller speed to the maximum of the turbine speed and the estimated impeller speed. In other embodiments, the final impeller speed may be set to the turbine speed at operation 232.

If no at operation 230 and if yes at operation 232, the final impeller speed is set to the maximum of the estimated impeller speed and the measured impeller speed at operation 234. If the impeller torque is negative control passes to operation 236 and the final impeller speed is set to the turbine speed plus an offset.

Figure 5:
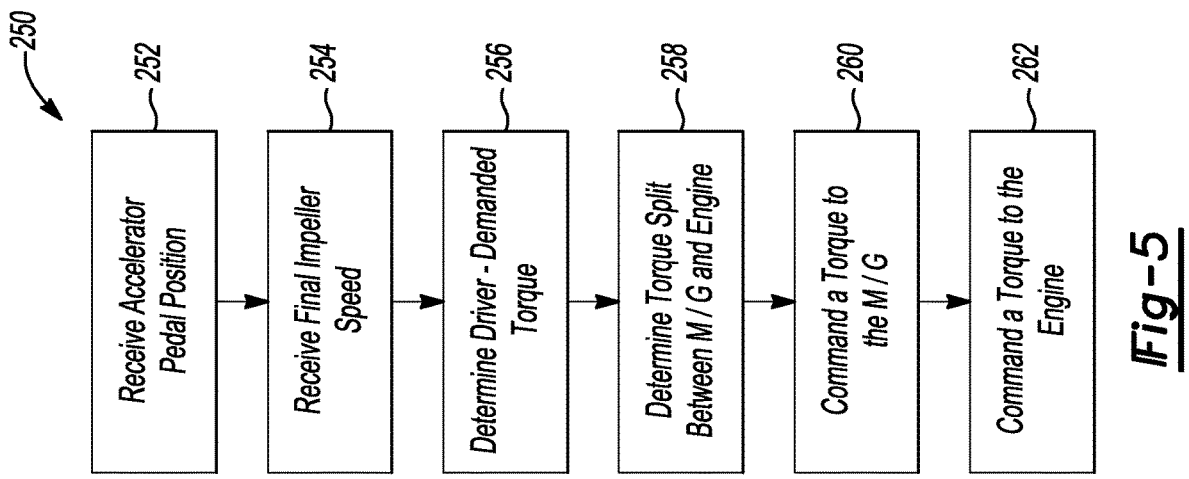
FIG. 5 illustrates a flow chart of an algorithm for commanding torques based on final impeller speed and accelerator pedal position.

FIG. 5 illustrates a high-level flow chart 250 for commanding a torque to an electric machine and/or an engine for propelling the vehicle. At operation 252, the controller receives an accelerator pedal position signal from a sensor associated with the accelerator pedal 52. The signal may be indicative of a percentage of pedal depression or the like. At operation 254, the controller receives the final impeller speed calculated using the controls 200. At operation 256, the controller determines a driver-demanded torque based on the received accelerator pedal position signal and the final impeller speed. The controller may include one or more lookup tables programmed in memory that correlate the accelerator pedal position and the impeller speed to output a driver-demanded torque. Once the driver-demanded torque is determined, the controller determines a torque split between the various actuators of the vehicle, e.g., engine 14 and M/G 18, at operation 258. The controller may include an arbitrator module that determines the torque split between the M/G and the engine. Using the arbitrator to determine a torque split between various actuators is known and will not be described here. In operation 260, the controller commands a torque to the M/G based on the determination at operation 258. In operation 262, the controller commands a torque to the engine based on the determination at operation 258. In some instances, the torque may be supplied solely by the engine or the M/G.

Figure 6A:
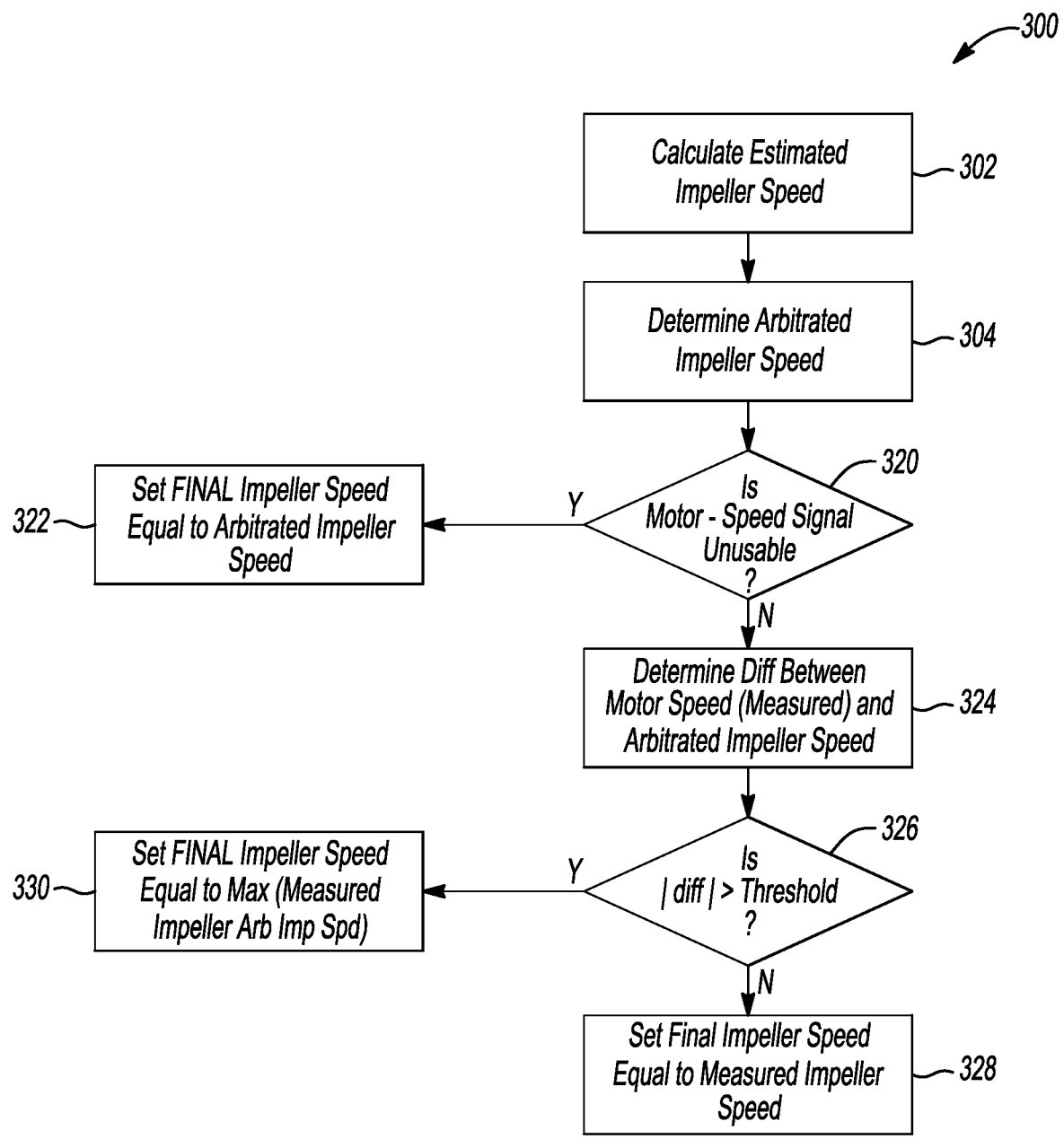
FIGS. 6A and 6B illustrate a flow chart of another algorithm for determining a final impeller speed.
Figure 6B:
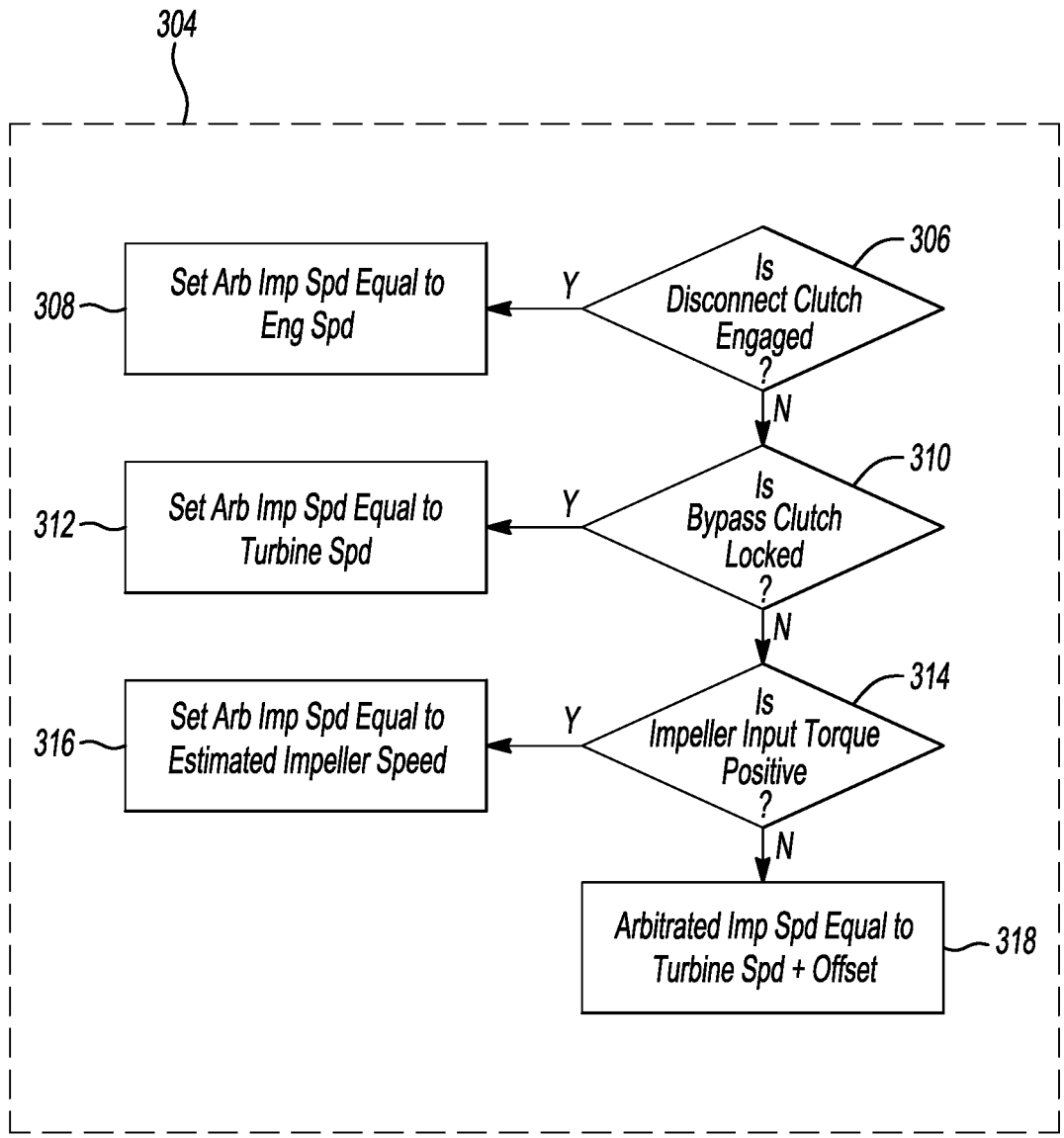

FIGS. 6A and 6B illustrate a flow chart 300 of another example algorithm for determining a final impeller speed. The flowchart 200 begins at operation 302 where the controller calculates an estimated speed of the impeller as described above. At operation 304, the controller determines an arbitrated impeller speed. The arbitrated impeller speed can be thought of as a refined estimated impeller speed and in some instances may be referred to as an estimated impeller speed. The arbitrated impeller speed may be set equal to the engine speed, the turbine speed, or the estimated impeller speed depending upon if operating conditions of the vehicle allows for validation. In operation 306, the controller determines if the disconnect clutch is engaged. When the disconnect clutch is engaged, the impeller and the crankshaft of the engine are fixed to each other and thus have the same speed. Thus, signals from the sensor 58 can be used to determine a measured impeller speed. If yes at operation 306, control passes operation 308 and the arbitrated impeller speed is set equal to the engine speed. Alternatively, the arbitrated impeller speed may be set equal to a maximum of the engine speed and the estimated impeller speed from operation 302.

If no at operation 306, control passes operation 310 and the controller determines if the bypass clutch is locked. When the bypass clutch is locked, the impeller and the turbine are fixed to one another. The speed sensor 62 measures the speed of the turbine shaft (transmission input shaft) and thus measures the speed of the impeller when the bypass clutch is locked. If the bypass clutch is locked, control passes operation 312 and the arbitrated impeller speed is set to the measured turbine speed. Alternatively, the arbitrated impeller speed may be set equal to a maximum of the turbine speed and the estimated impeller speed from operation 302.

If no at operation 310, control passes operation 314 and the controller determines if the impeller torque is positive. When the impeller torque is negative, the controller, at operation 318, sets the arbitrated impeller speed equal to the turbine speed plus an offset that is based on the geometry of the torque converter and other considerations. If the impeller torque is positive, the controller sets the arbitrated impeller speed equal to the estimated impeller speed (from operation 302) at operation 316.

Once the arbitrated impeller speed is determined control passes back to operation 320 and the controller determines if the measured impeller speed, e.g., signal from motor-speed sensor, is usable. If the signals from the sensors 60 are usable, the controller then determines whether or not they are valid at operation 324. The controller may determine the validity of the signals by comparing the measured impeller speed with the arbitrated impeller speed from operation 304. If the difference (absolute value) between the measured and arbitrated impeller speeds exceeds a threshold, then the validity of the measured impeller speed is questionable and will not solely used for controlling the torque command to the M/G. According to one or more embodiments, the threshold may be between 100 and 300 RPMs. At operation 326, the controller determines if the difference between the measured and arbitrated impeller speeds is greater than the threshold. If no, control passes to operation 328 and the final impeller speed is set equal to the measured impeller speed. If yes, the final impeller speed is set equal to the maximum of the measured impeller speed and the arbitrated impeller speed at operation 330. The final impeller speed of operation 330 may be used in conjunction with the flowchart 250 as described above to determine the driver-demanded torque.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:
1. A vehicle comprising:
a transmission including a torque converter having an impeller and a turbine;
an electric machine fixed to the impeller; and
at least one controller programmed to,
in response to a difference between measured and estimated speeds of the impeller exceeding a threshold, command a torque to the electric machine based on a maximum of the measured and estimated speeds of the impeller, and in response to the difference being less than the threshold, command another torque to the electric machine based on the measured speed of the impeller.

2. The vehicle of claim 1, wherein the estimated speed of the impeller is based on a speed of the turbine and an estimated torque of the impeller.

3. The vehicle of claim 2 further comprising a sensor configured to output a signal indicative of the speed of the turbine.

4. The vehicle of claim 2, wherein the torque commanded to the electric machine is further based on an accelerator pedal position.

5. The vehicle of claim 4, wherein the torque is further based on a temperature of the torque converter.

6. The vehicle of claim 1 further comprising a sensor configured to output a signal indicative of the measured speed of the impeller.

7. The vehicle of claim 6, wherein the sensor is disposed within the electric machine.

8. The vehicle of claim 6, wherein the controller is further programmed to, in response to the signal being unusable, command yet another torque to the electric machine based on the estimated speed of the impeller.

9. The vehicle of claim 1 further comprising an engine selectively connected to the electric machine.

10. A vehicle comprising:
an engine including a crankshaft;
a transmission including a torque converter having an impeller coupled to the crankshaft and a turbine fixed to a turbine shaft that is driveably connected to driven wheels of the vehicle;
an electric machine including a rotor selectively coupled to the crankshaft via a disconnect clutch and fixed to the impeller;
a first sensor configured to output a first signal indicative of a measured speed of the impeller;
a second sensor configured to output a second signal indicative of a measured speed of the turbine; and
a controller programmed to, in response to the disconnect clutch being disengaged and the first signal being unusable, command a torque to the electric machine based on an estimated speed of the impeller that is derived from the measured speed of turbine and an estimated torque of the impeller.

11. The vehicle of claim 10, wherein the controller is further programmed to compute a difference between the measured speed of the impeller and the estimated speed of the impeller, and (i) in response to the difference exceeding a threshold, command another torque to the electric machine based on the estimated speed of the impeller and (ii) in response to the difference being less than the threshold, command yet another torque to the electric machine based on the measured speed of the impeller.

12. The vehicle of claim 10, wherein the controller is further programmed to, in response to the disconnect clutch being engaged and the first signal being unusable, command another torque to the electric machine based on a speed of the engine.

13. The vehicle of claim 10, wherein the torque commanded to the electric machine is further based on an accelerator pedal position.

14. The vehicle of claim 13, wherein the torque commanded to the electric machine is further based on a temperature of the torque converter.

15. The vehicle of claim 10, wherein the estimated speed of the impeller is an arbitrated speed of the impeller, and wherein the controller is further programmed to set the arbitrated speed equal to the measured speed of the turbine in response to a bypass clutch of the torque converter being locked.

16. A vehicle comprising:
an engine including a crankshaft;
a transmission including a torque converter having an impeller coupled to the crankshaft and a turbine fixed to a turbine shaft that is driveably connected to driven wheels of the vehicle;
an electric machine including a rotor selectively coupled to the crankshaft via a disconnect clutch and fixed to the impeller;
a first sensor configured to output a first signal indicative of a measured speed of the impeller;
a second sensor configured to output a second signal indicative of a speed of the turbine; and
at least one controller programmed to,
calculate an estimated speed of the impeller based on the speed of turbine and an estimated torque of the impeller,
calculate an arbitrated impeller speed, wherein the arbitrated impeller speed is (i) equal to a speed of the engine responsive to the disconnect clutch being engaged and (ii) equal to the estimated speed of the impeller responsive to the disconnect clutch being disengaged,
compare the measured and arbitrated speeds of the impeller to determine a difference,
in response to the difference exceeding a threshold, set a final impeller speed equal to a maximum of the measured and arbitrated speeds of the impeller,
in response to the difference being less than the threshold, set the final impeller speed equal to the measured speed of the impeller, and
command a torque to the electric machine based on the final impeller speed and an accelerator pedal position.

17. The vehicle of claim 16, wherein the controller is further programmed to, in response to the first signal being unusable, set the final impeller speed equal to the arbitrated speed of the impeller.

18. The vehicle of claim 16, wherein the controller is further programmed to, in response to the disconnect clutch being engaged and the difference exceeding the threshold, set the final impeller speed equal to the speed of the engine.

19. The vehicle of claim 16, wherein the torque converter further includes a bypass clutch configured to rotationally couple the turbine to the rotor when locked, and wherein the controller is further programmed to (i) set the arbitrated impeller speed equal to the speed of the turbine responsive to the bypass clutch being locked.

20. The vehicle of claim 16, wherein the torque converter further includes a bypass clutch configured to rotationally couple the turbine to the rotor when locked, and wherein the controller is further programmed to (i) set the arbitrated impeller speed equal to the estimated speed of the impeller responsive to the bypass clutch and the disconnect clutch being disengaged.

* * * * *